Jan. 5, 1965    M. D. ERICSON    3,164,268
POST-INFLATING APPARATUS
Filed May 8, 1961    2 Sheets-Sheet 1

INVENTOR.
Merrill D. Ericson
BY
Wilson, Settle & Craig
ATTORNEYS

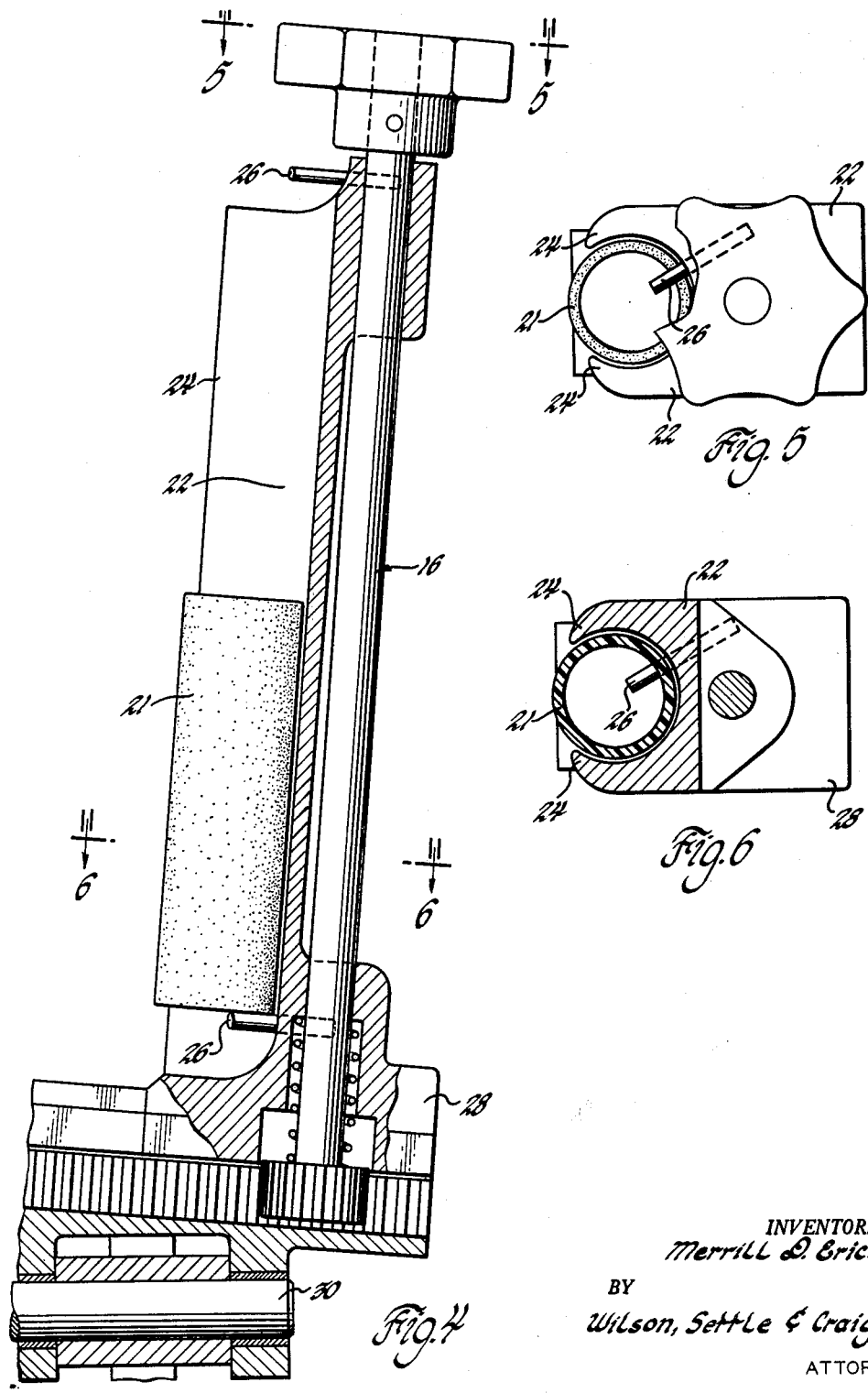

United States Patent Office 3,164,268
Patented Jan. 5, 1965

3,164,268
POST-INFLATING APPARATUS
Merrill D. Ericson, Dearborn, Mich., assignor to Firwood Manufacturing Company, Inc., Dearborn, Mich., a corporation of Michigan
Filed May 8, 1961, Ser. No. 108,368
12 Claims. (Cl. 214—1)

This invention relates to post-inflation machines used in manufacturing motor vehicle tires and is more specifically concerned with such machines having improved tire positioning devices.

In the application for U.S. patent Serial No. 27,139 filed May 5, 1960 by Ericson, Kilgore and Wright, the disclosure of which is incorporated herein by reference, there is disclosed a machine which automatically receives tires from a molding press, positions the tire relative to the separated halves of a chuck, clamps the tire between the halves of the chuck and inflates the tire on the chuck for processing after molding. While such machines have operated satisfactorily within their inherent limitations, there has been difficulty in accurately centering the tire in the chuck. This has resulted in failure to inflate the tire, consequent failure to process the tire and sometimes shutting down of the machine by automatic safety devices and even mechanical damage to the tire.

This difficulty or failure to center the tire has been aggravated or caused by adhering of the freshly molded and hot tire to a stop in the machine and consequent tipping of the tire on the lower half of the chuck as that half is being raised toward its mating half in the course of closing the chuck.

Accordingly it is an object of the invention to provide a post-inflation machine having an improved stop or positioning device which eliminates the foregoing difficulties.

It is also an object to provide a stop and particularly a retractible stop as a part of a post-inflating machine having a floating member which permits adjusting movements of the tire in the course of being centered by the chuck.

It is also an object to provide an improved stop which automatically releases the tire when the tire adheres to the stop and thus prevents the tire from being held offcenter even slightly during the closing of the chuck.

More specifically it is an object to provide means which positively moves at least the tire contacting surface of the stop and preferably the entire stop radially away from the tire as the tire is moved in the course of closing the chuck. That is, this movement of the stop or the movement of the tire contacting surface of the stop is substantially perpendicular to the line of movement of the tire and substantially parallel to the supporting surfaces of the chuck so that separation of a stop from an adhered tire will not tend to displace the tire on the chuck.

Other objects and advantages of the invention will be apparent from the following description and appended claims, reference being had to the accompanying drawings forming a part of this specification in which drawings each reference character always designates the same part throughout the various views.

In the drawings:

FIGURE 4 is an enlarged elevation of an improved stop assembly as seen in FIGURE 1, but partly in section;

FIGURE 5 is a plan of the stop mechanism as seen from the plane designated by 5—5 in FIGURE 4; and FIGURE 6 is a section on the line 6—6 of FIGURE 4.

Figure 1:
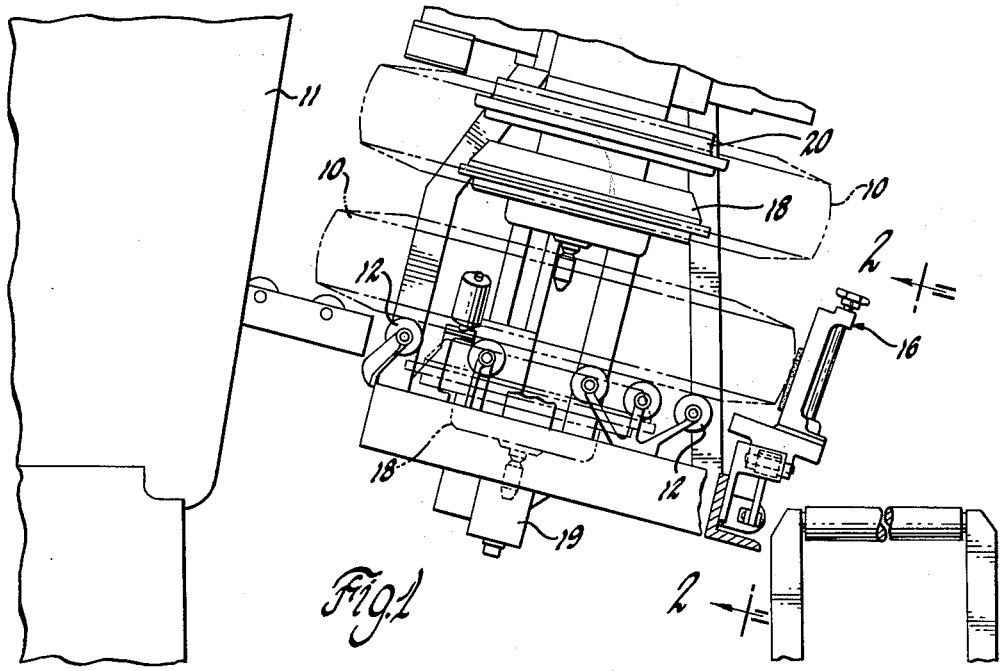
FIGURE 1 is an end elevation of a portion of a tire post-inflation machine embodying one form of the invention.
Figure 2:
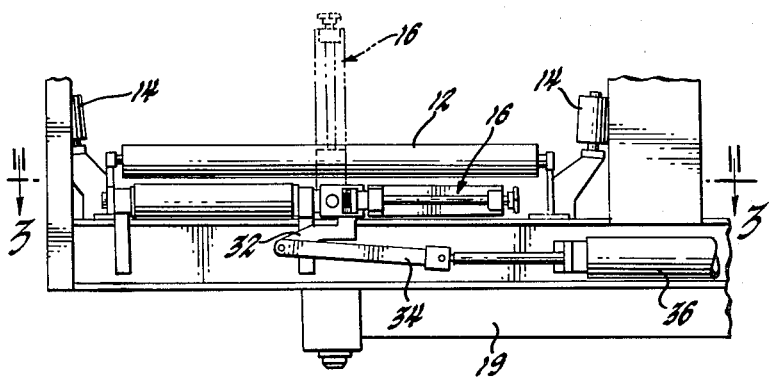
FIGURE 2 is a fragmentary side elevation as seen from the plane designated by 2—2 in FIGURE 1.

Referring to FIGURES 1 and 2, a tire 10 can slide by gravity from a molding machine 11 onto the roller platform 12 of any suitable post-inflation machine where it is held by side guide rollers 14 and an end stop designated as a whole by 16. The rollers and stop are adjustable to accommodate tires of different sizes and theoretically they center each tire accurately on the lower half 18 of a post-inflation chuck when this lower half is being raised from the broken line position to the full line position, as by an arm 19, to lift the tire from the platform and clamp it between the lower half 18 and the upper half 20 of the inflation chuck. The end stop 16 is movable from its vertical or operative position shown in full lines in FIGURE 1 and by broken lines in FIGURE 2, in which position it stops the tire as it enters the machine, to the horizontal position shown in full lines in FIGURE 2, in which latter position the stop lets the tire slide out of the post-inflation machine after the chuck has been separated and has returned the tire to the platform following the post-inflation treatment.

In the past it has happened that tires have adhered to the end stop and/or to one of the side rollers due to the hot and sometimes tacky state of the tire as it comes from the mold. When this occurs the tire may be held or pulled slightly offcenter on the lower half of the chuck, and the subsequent closing of the chuck (although it is intended to center precisely and automatically any tires that are offcenter) does not do so because the tire is firmly adhered to a stop or roller. When this occurs the tire is tipped or displaced on the chuck in the course of lifting the lower chuck half and the tire may not be placed in the chuck so as to hold air. Thus it will not be inflated and in addition it may be mechanically damaged by being pinched between the halves of the chuck.

In order to prevent such inaccurate positioning of the tire I prefer to make the end stop 16 or the side stops or rollers 14 or both so as to include a free-floating and movable stop element as described below. For illustration I have described the improved stop element as included in the end stop 16 only but it is within the scope of the invention to construct the side stops or rollers 14 so as to include such improved stop element. The stop element is preferably in the form of an elongated cylinder or roller 21 such as a tube as shown in FIGURE 4 and is supported in a shroud, cage, or guide 22. This cylinder support 22 is larger than the cylinder preferably by being arcuate and of a radius slightly larger than the radius of the cylinder and extending through an arc of more than 180 degrees so as to provide two wings or lips 24 spaced apart to provide an opening through which the stop element protrudes to engage the tire. The radius of the roller is large enough to prevent the roller passing through this opening and to extend the tire-contacting surface of the roller beyond the wings of the stop support so that the roller holds the tire out of contact with the stop support and prevents the tire from sticking to the stop support under all circumstances. Should a tire stick to the roller the loose fit between the roller and the cage permits the roller to move slightly with the tire if the tire has to move in the plane of its own support in the course of being centered.

Preferably the roller is made of material which does not readily stick to a hot tire, for example, Teflon, nylon or the like or any suitable composition which may have a lubricating or releasing or parting agent combined with it.

However to insure positive removal of the roller even if it should become stuck to the tire the cage includes means for positively moving at least the tire-contacting surface of the roller, and preferably the entire roller, away from the tire in response to movement of the tire away from the platform. One form of this means is the two wings 24 which diverge or slope away from the line of movement of the tire when the tire is being lifted from the platform. If the roller sticks to a tire, the roller is carried upward by the tire when the chuck is being closed this movement being permitted by the length of the cage which is about twice the length of the roller between stop pins 26. The cage is supported at the angle necessary to slope the wings 24 as referred to.

Then as a sticking cylinder or roller rises with a tire it is positively pulled away from the tire by the track or wedge formed by the wings of the cage. That component of motion of the roller which is caused by the slope of the cage moves the roller substantially perpendicular to the line of motion of the tire and substantially parallel to the plane of the rim of the chuck on which the tire is vertically supported. Since the tire cannot move horizontally no force which can be exerted by the roller on the tire can tip or displace the tire on the lowered chuck half.

Figure 3:
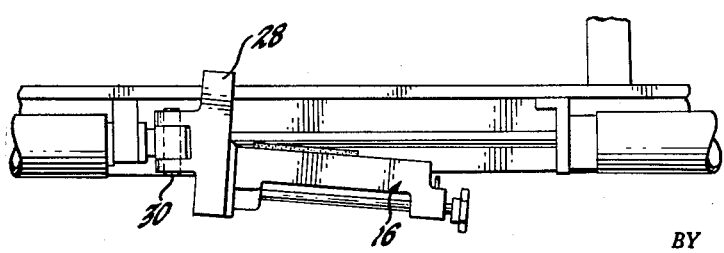
FIGURE 3 is a fragmentary plan view as seen from the plane designated by the line 3—3 in FIGURE 2.

The cage forms a part of the pivoted support for the roller. This includes a base 28 mounted on a pivot 30 so the entire stop assembly can be raised into the operating position shown in FIGURE 1 or lowered into the inoperative position shown in FIGURE 3 as by an arm 32, link 34 and cylinder 36, to permit a tire to slide out of the machine, all as more fully disclosed in said application of Ericson et al. referred to.

As shown in FIGURES 1, 2, 3, and 4, the base 28 is disposed at such an angle to the pin 30 that when the stop assembly is raised to operative position the axis of the stop roller 21 lies in a vertical plane through the center of the tire and chuck, but this axis is inclined upwardly and away from the line of movement of the center of the tire which line joins the upper and lower positions of the center of the lower chuck half 18.

It is to be understood that the invention is not limited in its application to the details of construction or arrangement of parts illustrated in the accompanying drawings since the invention is capable of other embodiments and of being practiced or carried out in various ways. Also, it is to be understood that the phraseology or terminology employed in the description is not for the purpose of limitation but only for illustration.

I claim:

1. A tire processing machine comprising in combination a tire support for receiving a tire, means for positioning the tire on the tire support and means for lifting the tire from the tire support, said positioning means including a stop having a surface adapted to contact the surface of a tire and a support for the stop, said stop support restraining the stop in a direction parallel to the tire support while permitting movement of the tire-contacting surface of the stop in a direction transverse to the tire support, and said stop support including means for positively moving the tire-contacting surface of the stop away from the tire in response to movement of the tire-contacting surface and tire in a direction transverse to the tire support.

2. A tire processing machine comprising in combination, a tire support for receiving a tire, means for positioning the tire on the tire support, and means for lifting the tire from the tire support along a line of movement transverse to the tire support, said positioning means including a stop adapted to contact the tire, and a support for the stop, said stop support restraining the stop in a direction parallel to the tire support while permitting movement of the stop in a direction transverse to the tire support, said stop support also including means for moving the stop along a line which diverges from the line of movement of the tire as the tire and stop move away from the tire support.

3. A tire processing machine comprising in combination a substantially horizontal tire support defining a plane for receiving a tire which is movable over the support in said plane, means for stopping movement of the tire in one direction in said plane, and means for lifting the tire from the tire support, said stopping means including a stop separate from the lifting means and having a stop support which when in stopping position is fixed against movement with respect to said plane in a direction transverse to said plane and said stop support having a tire-contacting surface movable with respect to the stop support in a direction transverse to the plane whereby the contacting surface can travel with a tire being lifted from the tire support and can move with respect to the stop support when the tire adheres to the contacting surface.

4. A tire processing machine comprising in combination a substantially horizontal tire support defining a plane for receiving a tire which is movable over the support in said plane, means for stopping movement of the tire in one direction in said plane, and means for lifting the tire from the support, said stopping means including a roller having a tire-contacting surface and a support for the roller which when in stopping position is fixed against movement with respect to said plane in a direction transverse to said plane, the roller support being separate from the lifting means and restraining the roller against translation in a direction parallel to the plane while permitting movement of the tire-contacting surface of the roller in a direction transverse to the plane whereby the contacting surface can travel with a tire being lifted from the tire support and can move with respect to the roller support when the tire adheres to the contacting surface.

5. A tire processing machine comprising in combination a substantially horizontal tire support defining a plane for receiving a tire which is movable over the support in said plane, means for stopping movement of the tire in one direction in said plane, and means for lifting the tire from the support, said stopping means including a roller having a tire-contacting surface and a support for the roller which when in stopping position is fixed against movement with respect to said plane in a direction transverse to said plane, said roller support being separate from the lifting means and restraining the roller against translation in a direction parallel to the plane while permitting axial movement of the roller in a direction transverse to the plane whereby the roller can travel with a tire being lifted from the tire support and can move with respect to the roller support when the tire adheres to the roller.

6. A tire processing machine comprising in combination a substantially horizontal tire support defining a plane for receiving a tire which is movable over the support in said plane, means for stopping movement of the tire in one direction in said plane, and means for lifting the tire from the support, said stopping means including a stop having a tire-contacting surface and a support for the stop, said stop support restraining but permitting limited movement of the stop in one direction parallel to the plane while permitting substantial movement of the stop in a direction transverse to the plane.

7. A tire processing machine comprising in combination a substantially horizontal tire support defining a plane for receiving a tire which is movable over the support in said plane, means for stopping movement of the tire in one direction in said plane, and means for lifting the tire from the support, said stopping means including a stop which when in stopping position is fixed against movement with respect to said plane in a direction transverse to said plane support and a stop which is slidable on the stop support, the stop having a tire-contacting surface, said stop support restraining the stop against movement parallel to the plane while permitting sliding of the stop on the stop support in a direction transverse to the plane whereby the stop can travel with a tire being lifted from the tire support and can move with respect to the stop support when the tire adheres to the stop.

8. A tire processing machine comprising in combination a substantially horizontal tire support defining a plane for receiving a tire which is movable over the support in said plane, means for stopping movement of the tire in one direction in said plane, and means for lifting the tire from the support, said stopping means including an elongated stop roller and a stop support partially surrounding the roller and having an opening facing said tire, to expose the roller to contact with the tire, the roller being slidable in the stop support and the diameter of the roller being greater than the width of said opening whereby the roller can slide in the stop when a tire is being lifted from the tire support and the tire adheres to the roller.

9. A tire processing machine comprising in combination a substantially horizontal tire support defining a plane for receiving a tire which is movable over the support in said plane, means for stopping movement of the tire in one direction in said plane, and means for lifting the tire from the support, said stopping means including an elongated stop roller and an arcuate support partially surrounding the stop roller, and having an opening to expose the roller to contact with the tire, the arc of said arcuate support being greater than 180° and having a radius greater than the radius of the roller and the diameter of the roller being greater than the width of the opening, the roller being slidable in the arcuate support whereby the roller can slide in the arcuate support when a tire is being lifted from the tire support and the tire adheres to the roller.

10. A tire processing machine comprising in combination a substantially horizontal tire support defining a plane for receiving a tire which is movable over the support in said plane, means for stopping movement of the tire in one direction in said plane, and means for lifting the tire from the support, said stopping means including a stop support and a stop slidable on the stop support, the stop having a tire-contacting surface, said stop support restraining the stop against movement in a direction parallel to the plane while permitting movement of the stop in a direction transverse to the plane and said stop support including means for positively moving the stop away from the tire in response to movement of the tire and stop in a direction transverse to the plane.

11. A tire processing machine comprising in combination a substantially horizontal tire support defining a plane for receiving a tire which is movable over the support in said plane, means for stopping movement of the tire in one direction in said plane, and means for lifting the tire from the support, said stopping means including a stop support and an elongated roller slidable on the stop support, the roller having a tire-contacting surface, said stop support restraining the roller against translation in a direction parallel to the plane while permitting movement of the roller in a direction transverse to the plane and said stop support including means for positively moving the roller away from the tire in response to movement of the tire and roller in a direction transverse to the plane.

12. Apparatus as defined in claim 11 in which the stop support is an arcuate member partially surrounding the roller and having an opening exposing the roller to contact with the tire and permitting axial sliding movement of the roller in the stop support.

References Cited in the file of this patent
UNITED STATES PATENTS

| | | |
|---|---|---|
| 210,696 | Humphrey | Dec. 10, 1878 |
| 2,237,615 | Roberts | Apr. 8, 1941 |
| 2,954,130 | Krebs | Sept. 27, 1960 |
| 2,993,315 | Verriner | July 25, 1961 |
| 3,008,180 | Woodhall | Nov. 14, 1961 |